United States Patent
Jahr

(10) Patent No.: US 9,686,417 B2
(45) Date of Patent: Jun. 20, 2017

(54) DEVICE, COMPUTER-READABLE MEDIUM, AND METHOD FOR MODIFYING SERVICES USING ADVANCED DATA COLLECTION CAPABILITIES

(71) Applicant: Giesecke & Devrient Mobile Security America, Inc., Dulles, VA (US)

(72) Inventor: Christoph Jahr, Ashburn, VA (US)

(73) Assignee: Giesecke & Devrient Mobile Security America, Inc., Dulles, VA (US)

( * ) Notice: Subject to any disclaimer, the term of this patent is extended or adjusted under 35 U.S.C. 154(b) by 45 days.

(21) Appl. No.: 14/693,101

(22) Filed: Apr. 22, 2015

(65) Prior Publication Data

US 2015/0229777 A1  Aug. 13, 2015

Related U.S. Application Data

(63) Continuation-in-part of application No. 14/301,858, filed on Jun. 11, 2014, which is a continuation-in-part
(Continued)

(51) Int. Cl.
*H04M 15/00* (2006.01)
*H04W 4/16* (2009.01)
(Continued)

(52) U.S. Cl.
CPC .......... *H04M 15/58* (2013.01); *H04M 15/85* (2013.01); *H04W 4/16* (2013.01); *H04W 4/24* (2013.01); *H04W 4/003* (2013.01)

(58) Field of Classification Search
CPC ......... H04W 4/003; H04W 4/12; H04W 4/14; H04W 4/20; H04W 24/00; H04W 4/24;
(Continued)

(56) References Cited

U.S. PATENT DOCUMENTS 7,945,589 B1   5/2011   Weiss et al.
8,301,795 B1   10/2012  Thenthiruperai
(Continued)

FOREIGN PATENT DOCUMENTS

WO    2009044371 A1    4/2009

OTHER PUBLICATIONS

United States Patent and Trademark Office, Non-Final Office Action for U.S. Appl. No. 13/892,073 (related to above-captioned patent application), dated Sep. 15, 2014.
(Continued)

*Primary Examiner* — Thai Vu
(74) *Attorney, Agent, or Firm* — Drinker Biddle & Reath LLP

(57) ABSTRACT

A device includes one or more processor, a display, and a module card. The one or more processor determines that a communication function of the device has terminated and sends a notification to the module card that indicates the termination. The module card sends a message to a server in response to receiving the notification and receives another message from the server. The message indicates that the device is ready to receive the other message. The other message includes an instruction and another notification, which is based on usage of an account and identifies an actionable category with respect thereto. The instruction causes the one or more processor to function as display, receiving, determining, and sending devices, which respectively display the other notification, receive an input response thereto, determine that the response corresponds to a confirmation to implement the actionable category, and send a further message including the response.

20 Claims, 11 Drawing Sheets

Related U.S. Application Data of application No. 13/892,073, filed on May 10, 2013, now Pat. No. 9,414,181.

(51) Int. Cl.
*H04W 4/24* (2009.01)
*H04W 4/00* (2009.01)

(58) Field of Classification Search
CPC ......... H04W 4/26; H04W 68/00; H04W 4/16; H04L 67/22; H04L 67/306; H04M 3/42153; H04M 15/58; H04M 15/70; H04M 15/85
USPC ................................ 455/418, 419, 420, 466
See application file for complete search history.

(56) References Cited

U.S. PATENT DOCUMENTS

| 8,560,454 | B1 | 10/2013 | Bhatia et al. |
|---|---|---|---|
| 2006/0052100 | A1 | 3/2006 | Almgren |
| 2006/0153073 | A1 | 7/2006 | Ghiware et al. |
| 2008/0268882 | A1 | 10/2008 | Moloney |
| 2009/0132559 | A1 | 5/2009 | Chamberlain et al. |
| 2010/0188992 | A1 | 7/2010 | Raleigh |
| 2010/0255819 | A1 | 10/2010 | Robles et al. |
| 2011/0014905 | A1 | 1/2011 | Eschenauer et al. |
| 2011/0320562 | A1 | 12/2011 | Lane et al. |
| 2012/0123951 | A1 | 5/2012 | Hyatt et al. |
| 2012/0275312 | A1* | 11/2012 | Cormier .................. H04W 4/20 370/241 |
| 2013/0198381 | A1 | 8/2013 | Caffrey et al. |
| 2013/0210456 | A1 | 8/2013 | Dong |
| 2013/0268591 | A1 | 10/2013 | Chen et al. |
| 2014/0143412 | A1 | 5/2014 | Martinez Perea et al. |
| 2014/0177592 | A1 | 6/2014 | Li et al. |
| 2014/0324694 | A1 | 10/2014 | Fernandes |

OTHER PUBLICATIONS

United States Patent and Trademark Office, Final Office Action for U.S. Appl. No. 13/892,073 (related to above-captioned patent application), dated Mar. 12, 2015.

Korean Intellectual Property Office, International Search Report for International Application No. PCT/US2015/018385 (related to above-captioned patent application), dated May 27, 2015.

Korean Intellectual Property Office, Written Opinion of the International Searching Authority for International Application No. PCT/US2015/018385 (related to above-captioned patent application), dated May 27, 2015.

International Searching Authority, International Search Report and Written Opinion in PCT/US2016/025277, mailed Jul. 22, 2016.

U.S. Patent and Trademark Office, Non-Final Office Action in U.S. Appl. No. 14/301,858, issued Aug. 15, 2016.

U.S. Patent and Trademark Office, Non-Final Office Action in U.S. Appl. No. 14/693,073, issued Sep. 15, 2016.

\* cited by examiner

US 9,686,417 B2

DEVICE, COMPUTER-READABLE MEDIUM, AND METHOD FOR MODIFYING SERVICES USING ADVANCED DATA COLLECTION CAPABILITIES

CROSS REFERENCE TO RELATED APPLICATION

This application is a Continuation-In-Part of U.S. patent application Ser. No. 14/301,858, filed on Jun. 11, 2014, which is a Continuation-In-Part of U.S. patent application Ser. No. 13/892,073, filed on May 10, 2013, the disclosures of which are incorporated herein by reference in their entirety.

TECHNICAL FIELD

The present disclosure relates to a device, computer-readable medium, and method for retaining and/or providing additional services within a wireless network.

BACKGROUND

Contemporary portable devices, such as mobile phones, permit users to communicate with a service provider over a network. Portable devices frequently include mobile equipment (ME) and a module card. The ME is the hardware of the portable device, which includes a display, a receiver, a transmitter, and other physical equipment. The ME is identified by a unique code. The module card stores the unique code that identifies the ME in a memory.

In existing portable devices, the module card serves as a network interface that connects the portable device to the network. The module card also contains a toolkit, which consists of a set of commands that are programmed into the module card. In portable devices, the module card functions as an interpreter that is equipped to run applications written in one or more programming languages. Moreover, in such devices, the module card includes a memory that stores these applications along with other information. Such other information frequently includes the unique code identifying the ME.

Today, many portable devices are connected to a wireless network, such as Global System for Mobile Communication ("GSM") network or successor network technologies such as, but not limited to, 3G and LTE, Edge, UMTS, HSPA, HSPA+, LTE Advanced, CDMA, 1xRTT, EVDO, and EVDO-A. In particular, GSM, and its successor technologies are standards set that describes protocols used in digital wireless communications among portable device users, service providers, and other parties. In such a network, the module card is a Subscriber Identity Module ("SIM") card or a Universal Integrated Circuit Card ("UICC"); the toolkit on the module card is a SIM Toolkit ("STK"); and the module card functions as a STK interpreter. In more sophisticated SIM cards, the STK is a Dynamic SIM Toolkit ("DSTK") and the STK interpreter is a DSTK interpreter.

In a wireless network, a service provider generates content corresponding to a message that is to be sent to a user. Such messages are often written in a markup language (for example, Wireless Internet Gateway Wireless Markup Language ("WIG WML"), SIM @lliance Toolbox Markup Language ("S@TML"), Java Markup Language ("JavaML")). The content is sent to a gateway, which prepares the message and forwards the message to the user. This gateway is known as the Universal Gateway ("UG"). The UG may be located on a server 101. The message includes an instruction, which itself is a SIM card instruction (for example, a wiblet, a s@tlet, a Java applet) (or alternatively, an UICC application) that is received by a portable device. The portable device contains a SIM card with its own memory that stores a DSTK. Properly programmed, the SIM card functions as a DSTK interpreter, which is configured to interpret the instruction contained in the message. Depending on whether the instruction comprises an XML-based feed interpreted by a wiblet, a s@tlet, or a Java applet, the DSTK interpreter functions as SmartTrust Wib ("Wib"), a SIM @lliance Toolbox ("S@T") interpreter, or a Java interpreter, respectively. The DSTK interpreter interprets the instructions to implement actions or commands included in the DSTK. Some of these commands operate independently of the portable device, and other commands are directed to the portable device, such as a command to display a string of text or ask the user for an input.

In certain wireless networks, users are required to periodically use their portable devices in order to retain services that are being provided by a service provider. In such networks, when a user fails to use their portable device at least once during a predefined period, then the user can be disenrolled and, therefore, is no longer be able to use and receive services from the service provider. Moreover, after the user loses access to the services provided, the user often is not able to communicate with the service provider using their portable device to reinstate the services.

As more users connect to service providers over wireless networks and the size of these networks increase, it becomes increasingly important from an efficiency and cost standpoint for service providers to monitor the frequency that users are using their services. By monitoring usage, a service provider may be equipped to aid users with retaining desired services.

In addition, in certain wireless networks, a service provider collects data relating to the user's portable device activity, for example, activity relating to overall usage, call activity, text messages and/or multimedia messages sent and received, internet activity, and other useful data. By monitoring this data, a service provider may be equipped to aid users with advanced retaining services relating to new and/or more pertinent services based on a user's circumstances and necessity.

SUMMARY OF THE INVENTION

According to an embodiment of the present invention, a method for presenting services to a subscriber includes certain processes. The method includes collecting usage data associated with an account for the subscriber that is associated with a portable device. The method includes storing usage data in a repository. The method includes determining whether the usage data satisfies a condition. The method includes determining whether an actionable category of data exists. The method includes determining an action based on the actionable category of data and a set of rules. The method includes receiving a first message from the portable device indicating that a communication function of the portable device has terminated. The method includes sending a second message to the portable device that requests an input from the subscriber via the portable device and is based on the action. The method includes receiving a third message from the portable device that includes a response to the second message.

According to another embodiment of the present invention, a device includes a processor, a display, and a module card. The processor determines that a communication function of the device has terminated and sends a first notification to the module card that indicates the termination. The module card sends a first message to a server in response to receiving the first notification and receives a second message from the server thereafter. The first message indicates that the device is ready to receive a second message, and the second message includes a second notification and an instruction. The second notification is based on usage data of an account associated with the device and identifies an action to take with respect to the account. The instruction causes the processor to function as display, receiving, determining, and sending devices, which respectively display the second notification, receive an input response to the second notification, determine that the response corresponds to a confirmation to take the action, and send a third message including the response to the second notification.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION

Figure 1:
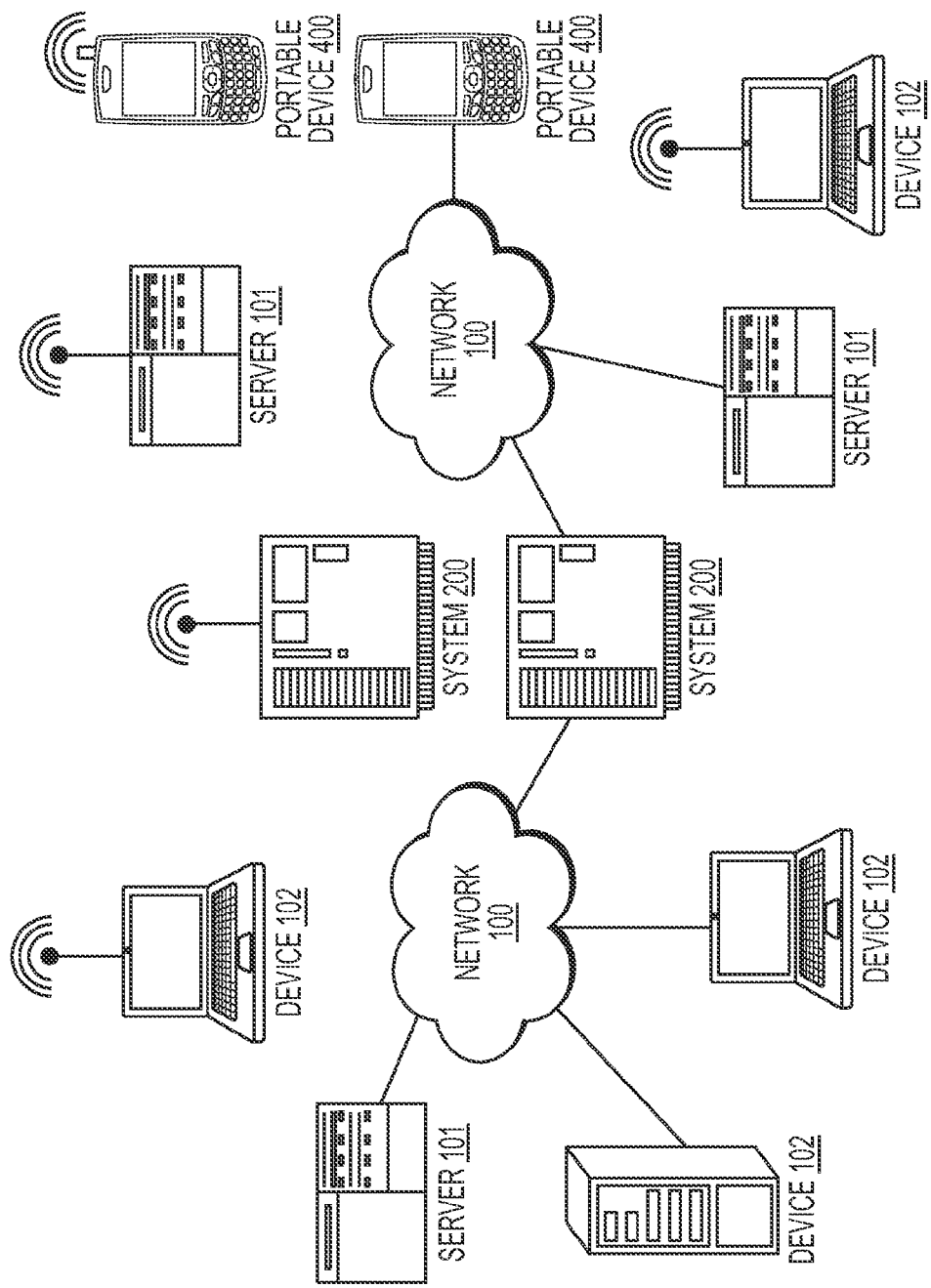
FIG. 1 is a schematic representation of an exemplary environment in which aspects of the disclosure are implemented.

Embodiments of the present invention, and their features and advantages, may be understood by referring to FIGS. 1-10, like numerals being used for corresponding parts in the various drawings.

Exemplary embodiments of the present invention provide a method, device, and computer-readable medium for retaining a service, such as might be provided by a service provider over a network. For example, the service comprises a mobile communication service. Users are required to utilize the mobile communication service on a regular basis or within a predetermined time period. For example, as a condition for enrollment to the mobile communication service, users are required to utilize the service once every sixty days. Utilization of the mobile communication service may involve making a call with a mobile device, sending a text message with the mobile device, or receiving a call or a text message with the mobile device; merely having physical possession of the mobile device may not be sufficient. In cases where a user does not utilize the mobile communication service on a regular basis, the present embodiment leverages an application on that user's mobile device to effect timely use. The application may comprise a Wib-based application, a S@T-based application, or a Java-based application. Wib-based applications are applications that are in the form of Wib bytecode; S@T-based applications are applications that are in the form of S@T bytecode; and Java-based applications are applications that are in the form of Java bytecode. Leveraging the application comprises executing the application in a mobile device, which comprises a SIM card or memory that functions as a DSTK interpreter that is configured to execute the application. The DSTK interpreter may comprise Wib, a S@T interpreter, or a Java interpreter based on the leveraged application type. Wib is configured to execute Wib-based applications; a S@T interpreter is configured to execute S@T-based applications; and a Java interpreter is configured to execute Java-based applications. Executing the application implements one or more commands that prompt the mobile device to display an actionable message or notification. In exemplary embodiments of the present invention, the notification asks the user if they would like to continue using the service. When the user responds affirmatively (for example, confirms that they would like to continue receiving the service, such as entering a command), the user's mobile device sends a text message with the confirmation to the service provider, thereby satisfying the usage requirement, and the service will remain uninterrupted.

Exemplary embodiments of the present invention also provide a method and device for advanced retention and/or upsell services, such as might be provided by a service provider over a network. Traditionally, a service provider has access to a tremendous amount of data with regard to its subscribers' mobile device usage and activity. For example, to name several, the service provider may access all the data associated with a billing system (for example, information relating to all aspects of user mobile device activity captured by the billing system); an Internet gateway (for example information relating to all the websites a user accesses); a wireless application protocol ("WAP") gateway; a short message service center ("SMSC"); a multimedia messaging service ("MMS"); and a handset repository (for example, information relating to all aspects of a user's mobile handset, including handset identification and information relating to handset usage and history and/or upgrades). The service provider, however, mainly uses these systems and gateways for providing services (that is, the billing system is used for determining mobile device usage in order to calculate an amount the user owes for services; the internet gateway is used for providing access to the internet to the user; the WAP gateway is used for converting websites on the World Wide Web into mobile-device-compatible web pages; the SMSC is used for the purpose of storing, forwarding converting, and delivering SMS messages; the MMS is used for the purpose of sending messages that include multimedia content; and the handset repository for obtaining and maintaining information on a user's mobile handset).

These databases, however, present an immense storage of highly valuable information relating to a user's mobile device use. As such, this highly valuable information can be accessed (or analyzed) in order to gain valuable insight into the user's mobile device usage, especially for the purposes of retaining existing users and/or selling additional or new services to users based on the characteristics of the user. Moreover, although service providers typically spend a lot of money to recruit and enroll new customers to their mobile device services, these service providers generally do not actively pursue sophisticated retention mechanisms or upselling mechanism with regard to their customer base (that is, those customers that are already purchasing one or more services with the service provider) most notably on a per-customer basis. As a result, service providers are not only unable to service the full potential of their mobile device customer base, but also lose a substantial amount of revenue to lost customers.

The exemplary embodiments of the present invention seek to access, utilize and transform the tremendous amount of raw data a service provider has available with regard to its subscribers' mobile device usage and activity into a multitude of actionable triggers that can be transformed into retention and/or upselling mechanisms. In particular, exemplary embodiments of the present invention provide a business intelligence ("BI") gateway to process raw user data and transform that raw data into meaningful and useful information for business purposes by allowing a service provider (or another entry, such as a mobile device reseller) to take advantage of certain subscriber mobile device use information to retain existing subscribers and/or sell additional or new services based on the characteristics and usage of the subscribers. In particular, once BI software is installed and integrated with the service provider's infrastructure (that is, installed into a retention and upsell engine middleware), the BI gateway collects data from the billing system, the internet gateway, the WAP gateway, the SMSC, the MMS, and the handset repository, and processes this data based on a set of predetermined parameters to extrapolate the characteristics of a user's mobile device usage (for example, from data from the user's last 12 months of mobile device usage). Such processed data can then be used to formulate actionable messages and send preconfigured actionable messages to be sent to the user, as discussed in detail below.

Moreover, exemplary embodiments of the present invention seek to provide actionable messages to users (for example, based on triggers determined from the data obtained by the BI gateway) as part of the retention and/or upselling mechanisms. For example, traditionally, service providers or resellers contact the subscribers via text message, email, traditional mail, and to a more limited extent, via telephone. While contacting the subscribers via text message, email, and traditional mail is passive and inexpensive, the subscriber simply receives a notification to take action and must either call the service provider (or reseller), go to a website, or travel to a retail outlet to take action. Thus, the "take rate" of these types of messages is historically low because it requires the subscriber to initiate the communication and take action following the receipt of a notification. Contacting the subscribers via telephone is generally more effective from a take-rate perspective, but has the disadvantage of significantly higher costs associated with not only making the call but also additional ancillary costs, as might be incurred with training and maintaining call staff.

In contrast, exemplary embodiments of the present invention provide actionable messages that include information and retention and/or upselling of additional or new services relevant to the subscriber, as determined from the analysis of BI server. As discussed in more detail below, such messages can provide actionable options for the user for the purpose of changing and/or updating current services, or adding and/or updating new services. For example, the user can make a selection of multiple options, can select "yes/no," or can input an answer. In addition, the actionable messages can be presented to the user top-of-screen so that accessing a message does not require drilling down through any menus or going into any particular applications. In some embodiments, a user may not be able to exit the top-of-screen presentation of an actionable message unless an action occurs, for example, the user presses "cancel," or the messages times out after a predetermined amount of time.

Exemplary embodiments of the present invention also provide the BI server with the ability to mine information from resellers in addition to mining data from subscribers. This reseller information adds additional complexity to the analysis of a subscriber's mobile device usage for the purpose of defining preconfigured actionable messages to be sent to the user.

Furthermore, exemplary embodiments of the present invention may use a universally compatible server platform that couples to both the BI server and service provider for the purpose of binary messaging, such as to push messages to the mobile device subscriber, in addition to receiving messages from the mobile device subscriber. As discussed above, a DSTK may be stored in the memory of a SIM card, and, when properly programmed, the SIM card functions as a DSTK interpreter for instructions which may take the form of a wiblet, a s@tlet, or a Java applet. Thus, a universal gateway (for example, Giesecke & Devrient's (G&D) SmartàLaCarte Universal Gateway, found on G&D's website) coupled between the DSTK interpreter and the service provider's server and BI server would empower these servers with capability of sending messages regardless of the language of the instructions.

Referring to FIG. 1, a schematic representation of an exemplary embodiment of the present invention will be described. The environment comprises one or more network(s) 100. Network 100 comprises at least one of a wireless network, a wired network, a local area network (LAN), a wide area network (WAN), an over-the-air (OTA) network, a telecommunication network, and a mobile communication network. One or more servers 101 and other network entities operated by service providers, information providers, users, and other parties is coupled to network 100; one or more devices 102 utilized by service providers, information providers, users, and other parties is also coupled to network 100; and one or more portable devices 400 utilized by users is also coupled to network 100. Service providers and information providers provide services and information to other parties utilizing network 100 and servers 101, devices 102, and portable devices 400 that are coupled to network 100. The services and information comprise communication services (for example, wired communications services, wireless communications services, electronic communications services), portable device services (for example, mobile device distributing services, mobile device provisioning services), module card services (for example, SIM card distributing services, SIM card provisioning services, SIM card activation services), retention services, positioning services, billing services (for example, everything that is sent to/from a portable device user and/or a portable device service subscriber), security services, customer care services, language services, travel services, software update services, internet gateway services (for example, information on what/how much data is sent to and from the portable device user), MMS information and usage, SMSC information and usage, and handset repository information, to name several.

Servers 101 comprise one or more of general purpose computing devices, specialized computing devices, mainframe devices, wired devices, wireless devices, monitoring devices, infrastructure devices, and other devices configured to provide one or more of services and information to service providers, users, and other parties. Devices 102 comprise one or more of general purpose computing devices, specialized computing devices, mainframe devices, mobile devices, wired devices, wireless devices, monitoring devices, infrastructure devices, and other devices utilized by service providers, information providers, users, and other parties. Portable devices 400 comprise mobile devices, wired devices, wireless devices, handheld devices, and other portable devices utilized by users. Exemplary embodiments provide servers 101 and devices 102 that monitor portable devices 400 and collect information from or about portable devices 400 that are coupled to network 100 and users utilizing portable devices 400 that are coupled to network 100.

Moreover, a system 200 is also coupled to networks 100. System 200 comprises one or more of a general purpose computing device, a specialized computing device, a mainframe device, a wired device, a wireless device, a monitoring device, an infrastructure device, and any other device configured to collect variable data from one or more data sources (for example, servers, sensors, networks, interfaces, other devices). System 200, amongst other activities, monitors servers 101, devices 102, portable devices 400, and other devices coupled to network 100 for available information from or about portable devices 400 and their use that are coupled to network 100 and users utilizing portable devices 400 that are coupled to network 100. By collecting information about portable devices 400 and users utilizing portable devices 400, system 200 identifies last usage periods for one or more services. System 200 subsequently determines whether the one or more last usage periods are greater than a threshold, and, if so, generates content corresponding to one or more messages that are sent to portable devices 400 and users that utilize portable devices 400.

In exemplary embodiments of the present invention, system 200, portable devices 400, and some servers 101 and devices 102 are coupled to a first network 100 and system 200 and other servers 101 and devices 102 are coupled to a second network 100. For example, system 200, a portable device 400, a first server 101x, and a second server 101GS are coupled to the first network 100. In such embodiments, a service provider may utilize a first network 100 and a second network 100 to provide a service to a user utilizing the portable device 400. Exemplary embodiments provide for the first server 101x to comprise a monitoring device configured to collect service usage data. System 200 monitors the first server 101x for information about a particular portable device 400 and the user. The particular portable device 400 stores, amongst other data, usage data on the service comprising a last usage time corresponding to the user. System 200 collects the usage data on the service from portable device 400 and uses the usage data to determine a last usage period of the user by assessing the period of time between the last usage time and the current time. System 200 subsequently determines whether the last usage period is greater than or equal to a threshold, and, if so, generates content corresponding to a first message (described below) that is sent to the user. System 200 subsequently sends the content to the second server 101GS. The second server 101GS then uses the content to prepare the first message and sends the first message to the user.

In exemplary embodiments, the second server 101GS is known as the Universal Gateway ("UG"). Exemplary embodiments also provide for a third server 101SP, which, along with system 200, couples to the second network 100. The third server 101SP corresponds to the service provider. After system 200 sends the content to the second server 101GS, system 200 receives a second message (described below) from the user. System 200 then sends the second message to the third server 101SP. In this example, system 200 comprises middleware between the portable device 400, which is utilized by the user, and the third server 101. This middleware is known as the Retention Middleware ("RM"). Alternatively, the middleware can be located on separate server of servers 101 (for example, a RM server 101rm).

In exemplary embodiments, system 200 includes one or more of servers 101 and devices 102. In other exemplary embodiments, system 200 is separate from servers 101 and devices 102. In certain exemplary embodiments, one or more devices 102 are portable devices 400. In still other exemplary embodiments, portable devices 400 are separate from devices 102.

Figure 2:
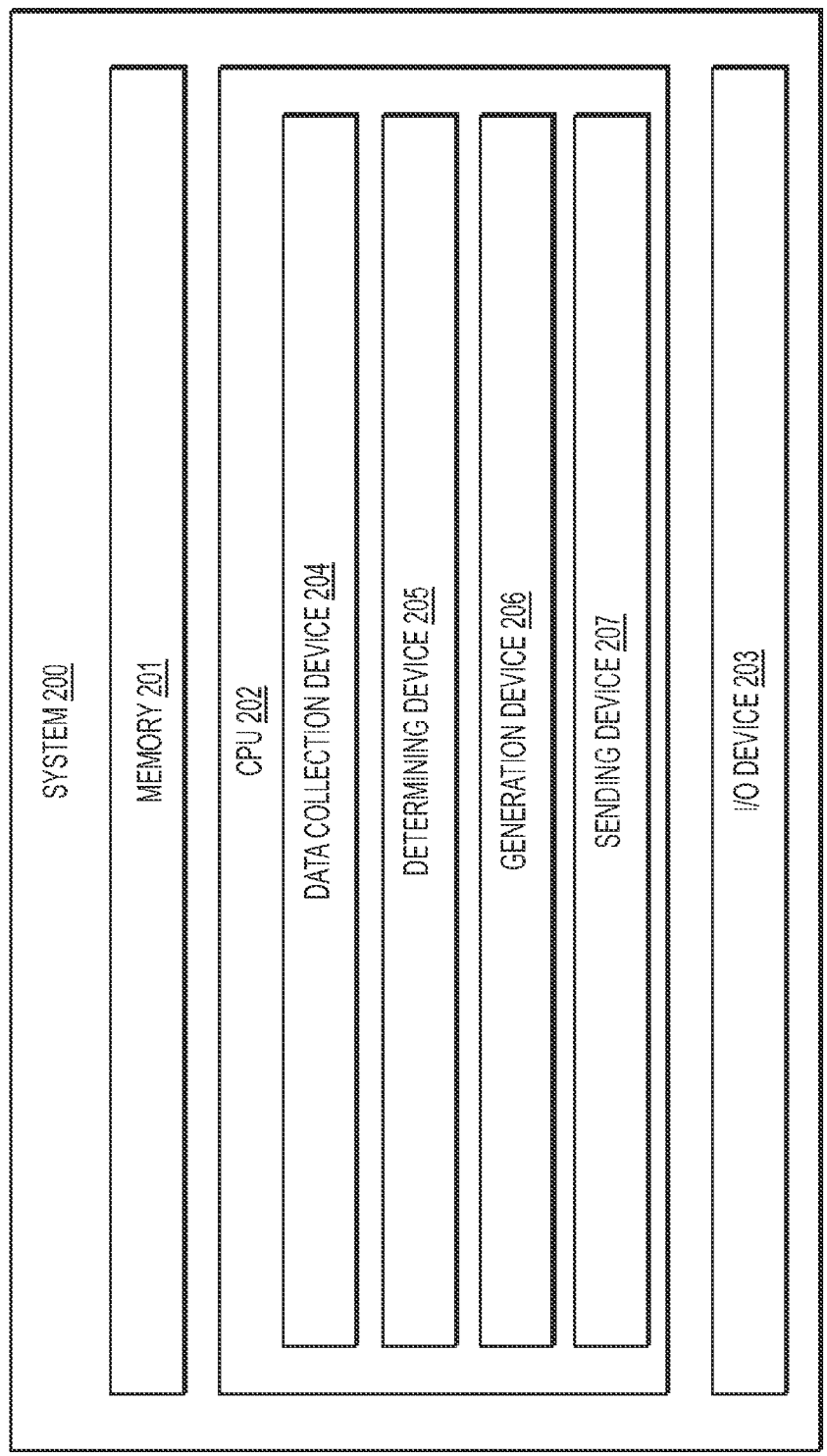
FIG. 2 is a schematic representation of an exemplary system configured to retain services.

Referring to FIG. 2, system 200, which collects usage data on a service, determines a last usage period for the service, determines whether the last usage period is greater than a threshold, generates content corresponding to a first message that is sent to a portable device in response to determining that the last usage period is greater than a threshold, and sends the content to a gateway, is described. System 200 comprises a memory 201, a central processing unit ("CPU") 202, and an input and output ("I/O") device 203. Memory 201 stores computer-readable instructions that instruct system 200 to perform certain processes. In particular, when executed by CPU 202, the computer-readable instructions stored in memory 201 instruct CPU 202 and associated hardware to operate as one or more of a data collection device 204, a determining device 205, a generation device 206, and a sending device 207. In particular exemplary embodiments, one or more of data collection device 204, determining device 205, generation device 206, and sending device 207 are located in remote or local devices.

I/O device 203 receives one or more of data from network 100, data from other devices and sensors coupled to system 200, and input from a user and provides such information to CPU 202. I/O device 203 also transmits or sends data to other devices coupled to network 100 and sends a notification to a user. Further, I/O device 203 implements one or more of wireless and/or wired communications between system 200 and other devices.

Figure 3:
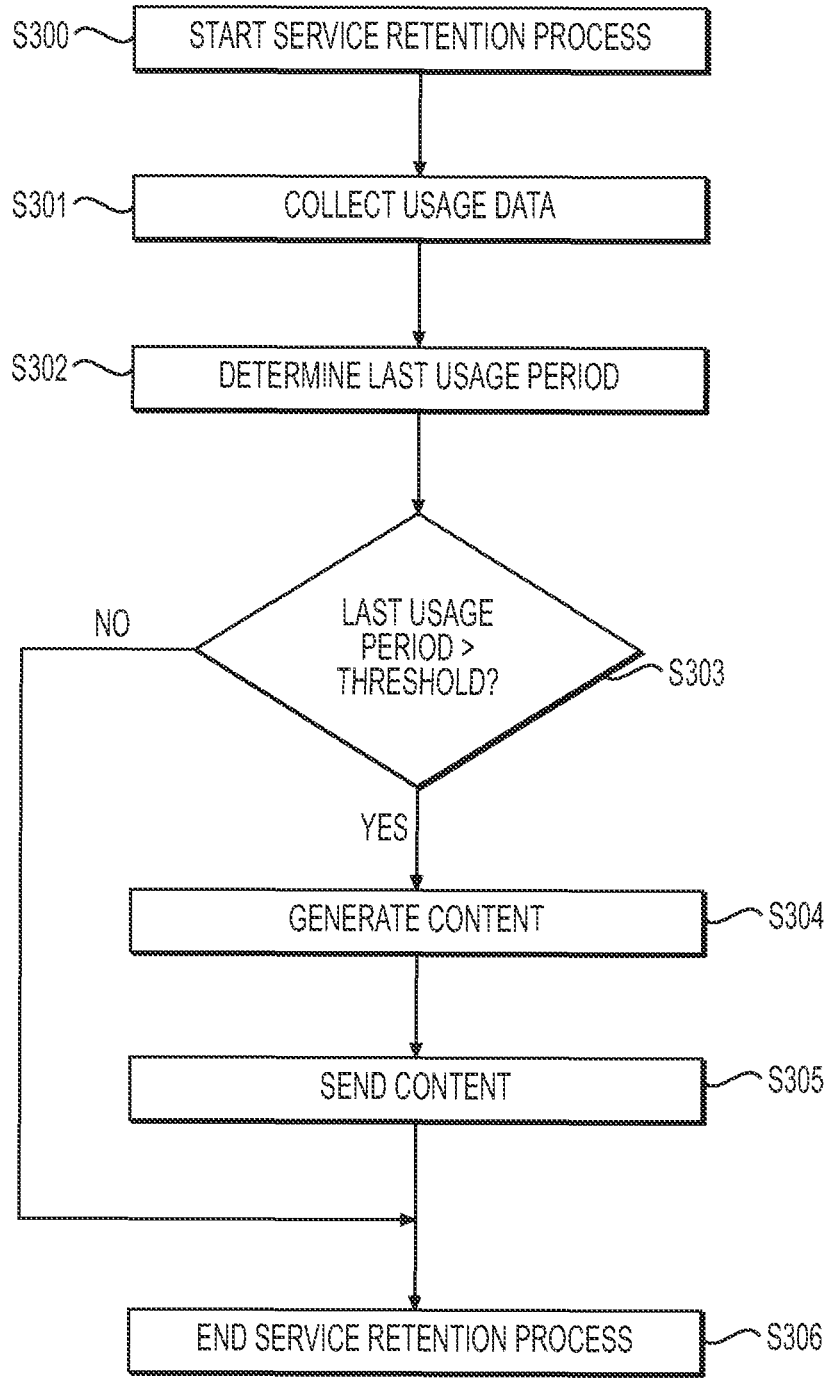
FIG. 3 presents a flow chart showing a method for retaining services according to particular embodiments of the invention.

Referring now to FIG. 3, an exemplary process performed by data collecting device 204, determining device 205, generation device 206, and sending device 207 is described. FIG. 3 shows a process for retaining services, starting at S300. In S301, data collection device 204 collects usage data on a service, such usage data comprising a last usage time of a portable device 400. For example, the service comprises at least one of a communication service (for example, a wireless communication service), a portable device service (for example, a mobile device distributing service), a module card service (for example, a SIM card distributing service, a SIM card provisioning service), or other such services. The service may be provided by one or more service providers, such as wireless carriers, wireless resellers, portable device suppliers, SIM card suppliers, or private label resellers or Mobile Virtual Network Operators ("MVNO"). The last usage time is a time that a user last used the service on the portable device 400, such as a time of day (for example, 1:00 p.m., 13:00) and a month and day of a year (for example, 11/15/2012). In S302, determining device 205 determines a last usage period for the service, such as the period between the last usage time and a current time (for example, the time that the last usage period for the service is currently being determined). Similar to the last usage time, the current time includes, for example, a time of day (for example, 1:00 p.m., 13:00) or a month and day of a year (for example, 11/30/2012). The period between the last usage time and the current time is determined as the amount of time that has elapsed between the last usage time and the current time, a number of days that has elapsed between the last usage time and the current time, a number of months that has elapsed between the last usage time and the current time, or other numeric expression of time that has elapsed between the last usage time and the current time. Continuing from the examples above, when the last usage time is "1:00 p.m., 11/15/2012" and the current time is "1:00 p.m., 11/30/2012," determining device 205 would determine that the last usage period is 360 hours or, alternatively, fifteen days. As another example, when the last usage time is "1:00 p.m., 7/20/2012" and the current time is "1:00 p.m., 11/20/2012," determining device 205 would determine that the last usage period is 123 days or, alternatively, four months.

Subsequently, in S303, determining device 205 determines whether the last usage period is greater than a threshold. The threshold is a predetermined value, such as an amount of time, a number of days, a number of months, or other numeric expression of a period of time. When determining device 205 determines that the last usage period is greater than the threshold (S303: YES), the process proceeds onto S304 to Generate Content. For example, continuing from the last example, the threshold may be sixty days or, alternatively, two months. When determining device 205 determines that the last usage period, 123 days or four months, is greater than the threshold, then the process proceeds onto S304. When determining device 205 determines that the last usage period is not greater than the threshold (S303: NO), the process terminates at S306.

In S304, generation device 206 generates content corresponding to a first message that is sent to the user in response to determining that the last usage period is greater than the threshold. The content may be written in any language that would be known to those of ordinary skill in the art, such as, for example, a markup language. Markup languages comprise, for example, WIG WML, S@TML, and JavaML. The first message comprises a notification and a first instruction. The notification comprises a retention question that asks the user whether he or she would like to retain or continue receiving the service. For example, if a user is receiving a wireless communication service from a wireless carrier referred to as "A," the first message might read: "Would you like to continue receiving A's wireless communication service?" The first instruction, when interpreted and executed by a first computer, implements a plurality of commands. The first instruction comprises an application. For example, in a GSM network, the first instruction comprises a wiblet, a s@tlet, or a Java applet. The wiblet is a small application that is Wib-based; the s@tlet is a small application that is S@T-based; and the Java applet is a small application that is Java-based. As described above, a Wib-based application is an application that is in the form of Wib bytecode and is executed by Wib (for example, a Wib interpreter); a S@T-based application is an application that is in the form of S@T bytecode and is executed by a S@T interpreter; and a Java-based application is an application that is in the form of Java bytecode and is executed by a Java interpreter.

Implementing the plurality of commands causes a second computer to display the notification. The first and second computers are either physical entities (for example, a portable device, a module card) or logical entities (for example, a process, a program, a service, a virtual machine). The first computer, for example, is a module card that functions as an interpreter. The interpreter is at least one of Wib, a S@T interpreter, or a Java interpreter. Displaying the notification comprises displaying the notification on a display (for example, a visual display or a tactile display). Implementing the plurality of commands also causes the second computer to receive an input as a response to the notification. The input may comprise a text input, such as affirmation language (for example, "Y," "Yes," "Sure," "Why Not," "Yea," "Yeah," "Yup," "Go for it") or declination language (for example, "Nah," "Nope," "Negative"), or a selection of a presented option (for example, a selection of button or key representing an affirmation, a selection of a key representing an declination). Implementing the plurality of commands further causes the second computer to send a second message comprising the response to the notification. The second message is received by the service provider. The second message comprises the response to the notification in, for example, a 7-bit Short Message Service ("SMS") message, an 8-bit SMS message, a Unstructured Supplementary Service Data ("USSD") message, MMS or other type of cellular network message.

In certain exemplary embodiments, displaying the notification comprises displaying the notification on the display to cover an item (for example, an application, an image, a message, a file, and data) previously displayed on the display. In other exemplary embodiments, sending the second message comprises sending the second message to a network entity (for example, a node, a link, a server, or other active element in a network). In still other exemplary embodiments, implementing the plurality of commands causes the second computer to further determine whether the response corresponds to a confirmation to continue services and to send the second message when the response corresponds to the confirmation to continue services. The confirmation to continue services may be a predetermined value, such as a text value (for example, "Y", "Yes") or a numerical value, or a predetermined signal (for example, a particular type of pulse).

In particular exemplary embodiments, the first computer and the second computer are located in a single device, such that, for example, and the first computer is a module card that is located a portable device 400, and the second computer is a processor located in the same device. In other exemplary embodiments, the first and second computers are provided in more than one device.

In S305, sending device 207 sends the content to a gateway known, in exemplary embodiments, as the Universal Gateway ("UG"). After receiving the content, the gateway prepares the first message and sends the first message to the portable device 400 corresponding to the user. In a GSM network, for example, the first message comprises the notification and the first instruction in at least one of a 7-bit SMS message, an 8-bit SMS message, a USSD message, a MMS message, or other type of cellular network message. Preparing the first message comprises converting the content and encoding the converted content in a type of message.

For example, when sending device 207 sends content that is written in WIG WML to the gateway, the gateway prepares a first message by converting the content into Wib bytecode and encoding the converted content in a 7-bit SMS message. Alternatively, when sending device 207 sends content that is written in S@TML to the gateway, the gateway prepares the first message by converting the content into S@T bytecode and encoding the converted content in a 7-bit SMS message. In both of these examples, the 7-bit SMS message or first message are subsequently sent to the portable device. The portable device, as described below, may comprise a module card. The module card can function as an interpreter that is configured to interpret the first instruction. In a wireless network, for example, the portable device comprises a SIM card, wherein the SIM card functions as a DSTK interpreter. In such configurations, the DSTK interpreter is at least one of Wib, a S@T interpreter, or a Java interpreter.

Figure 4:
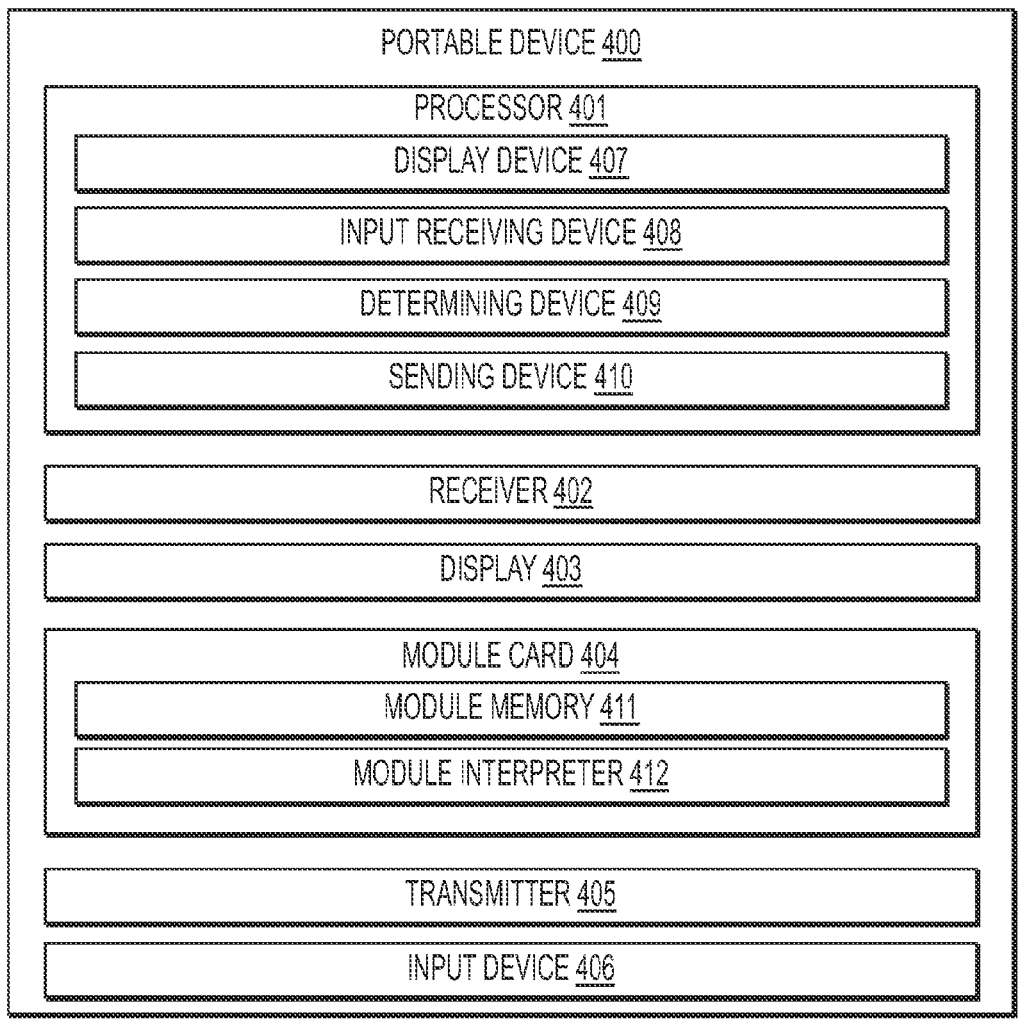
FIG. 4 is a schematic view of a portable device according to particular embodiments of the invention.

Referring to FIG. 4, portable device 400, which is configured to retain services, is described. Portable device 400 comprises a processor 401, a receiver 402, a display 403, a module card 404, a transmitter 405, and an input device 406. Module card 404 comprises a module memory 411. Module memory 411 stores a second instruction that, when executed by module card 404, instructs module card 404 to operate as a module interpreter 412. Receiver 402 receives a first message, wherein the first message comprises a notification and a first instruction. The first message is sent by a service provider. As described above, the first message comprises the notification and the first instruction in at least one of a 7-bit SMS message, an 8-bit SMS message, a USSD message, or other type of cellular network message. The notification is a retention question that asks the user whether he or she would like to retain or continue receiving the service. The first instruction comprises an application. For example, in a GSM network, the first instruction comprises a wiblet, a s@tlet, or a Java applet. The service provider comprises at least one of a wireless carrier, a wireless reseller, a portable device supplier, a SIM card supplier, and a MVNO. In certain exemplary embodiments, receiver 402 receives the first message from a network entity (for example, a node, a link, a server, or other active element in a network).

Module memory 411 stores the first message. Module memory also stores a toolkit. The toolkit comprises the plurality of commands. Module interpreter 412 is configured to interpret the first instruction. The first instruction, when interpreted and executed by module interpreter 412, implements a plurality of commands. In particular, implementing the plurality of commands causes processor 401 to operate as one or more of a display device 407, an input receiving device 408, a determining device 409, and a sending device 410.

Display device 407 is configured to display the notification on display 403. Display 403 comprises, for example, a visual display or a tactile display. In certain exemplary embodiments, display device 407 is configured to display the notification such that the notification covers an item previously displayed on display 403. As described above, the item comprises, for example, an application, an image, a message, a file, and data. Input receiving device 408 is configured to receive an input (for example, a text input) as a response to the notification. The user may use input device 406 to provide the input. Input device 406 comprises, for example, an alpha-numeric keypad or other input source.

Subsequently, determining device 409 is configured to determine whether the response corresponds to a confirmation to continue services. Further, sending device 410 is configured to send a second message using transmitter 405 when the response corresponds to the confirmation to continue services (for example, a predetermined value such as a text value). Similar to the first message, the second message comprises the response to the notification in at least one of a 7-bit SMS message, an 8-bit SMS message, a USSD message, or other type of cellular network message. As described above, the confirmation to continue services is a predetermined value such as a text value, a numeric value, or a predetermined signal.

In certain exemplary embodiments, portable device 400 does not function as a determining device 409. In particular, in such exemplary embodiments, input receiving device 408 receives an input as a response to the notification, and sending device 410 subsequently sends the second message using transmitter 405. The second message is received by the service provider. In other exemplary embodiments, sending device 410 sends the second message to a network entity corresponding to a service provider. As described above, the network entity is, for example, a node, a link, a server, or other active element in a network.

Figure 5:
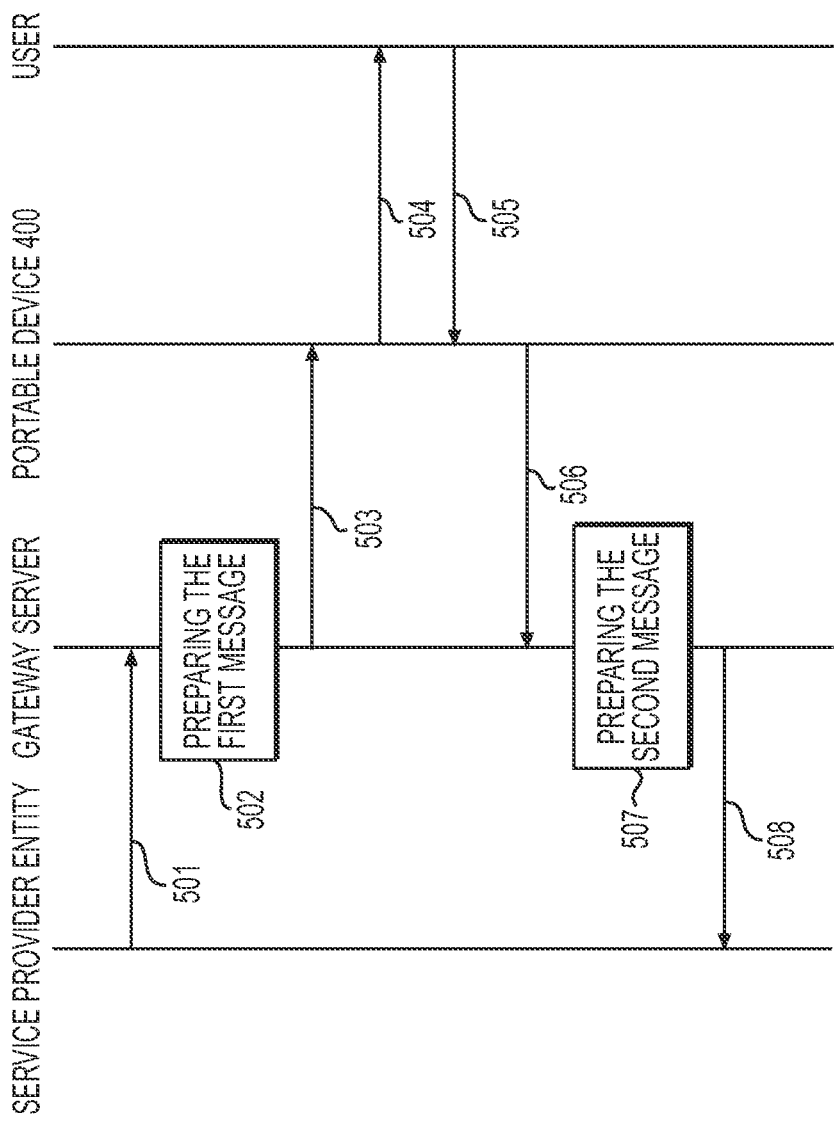
FIG. 5 presents a flow chart illustrating particular embodiments of the invention.

Referring to FIG. 5, a flow chart of a particular embodiment of the invention is described. This embodiment of the invention takes place in the environment in accordance with FIG. 1 with networks 100, servers 101, devices 102, system 200, and portable devices 400. In particular, the environment comprises a first network 100, a server 101, system 200, and a portable device 400. The portable device 400 and the server 101 are coupled to the first network 100. System 200 and the server 101 are coupled to the second network 100. The portable device 400 is utilized by a user. System 200 is a network entity that corresponds to a service provider, thus, system 200 is referred to as a "Service Provider Entity" ("SP"). The server 101g is a gateway; thus, the server 101g may be referred to as a "Gateway Server" ("GS"). The first network 100 is a wireless network; and the second network 100 is a computer network. The computer network may employ a network protocol such as Hypertext Transfer Protocol ("HTTP") or Short Message Peer-to-Peer ("SMPP").

The SP monitors other servers 101 and devices 102 that are coupled to the wireless network and the computer network for information about the portable device 400 and the user. The information comprises usage data on a service. The service may be provided by the service provider or another party (for example, a new service provider). By collecting the usage data on the service, system 200 determines a last usage period for the service, in which the last usage period comprises a period between the last usage time and a current time. System 200 subsequently determines whether the last usage period is greater than a threshold, and when it determines that the last usage period is greater than the threshold, system 200 generates content corresponding to a first message. As described above, the content may be written in a markup language, such as, for example, one or more of WIG WML, S@TML, and JavaML. Signal 501 represents this content.

In FIG. 5, signal 501 is sent from system 200 to the GS over the computer network. The GS prepares the first message and sends the first message to the portable device 400. The first message comprises a notification and a first instruction in at least one of a 7-bit SMS message, an 8-bit SMS message, a USSD message, or other type of cellular network message. As described above, the notification contained in the first message comprises a retention question that asks the user whether he or she would like to retain or continue receiving the service, and the first instruction comprises an application (for example, a wiblet, a s@tlet, or a Java applet). A wiblet is an application that is in the form of Wib bytecode; a s@tlet is an application that is in the form of S@T bytecode; and a Java applet is an application that is in the form of Java bytecode.

In step 502, the GS prepares the first message. Preparing the first message comprises converting signal 501 into a portable code or bytecode and encoding the converted signal in a type of message. The bytecode is, for example, Wib bytecode, S@T bytecode, and Java bytecode. Specifically, when signal 501 is written in WIG WML, the GS converts signal 501 into Wib bytecode and encodes the converted signal in a SMS message or USSD message. Alternatively, when signal 501 is written in S@TML, the GS converts signal 501 into S@T bytecode and encodes the converted signal in a SMS message or USSD message. Alternatively, when signal 501 is written in JavaML, the GS converts signal 501 into Java bytecode and encodes the converted signal in a SMS message or USSD message. The SMS message or USSD message after encoding may be the first message. Signal 503 represents this first message.

In FIG. 5, signal 503 is sent from the GS to the portable device 400 over the wireless network. The portable device 400 comprises a receiver, a processor, a display, a module card, and a transmitter. The module card comprises a memory that is configured to store signal 503. The memory is configured to also store a toolkit and a second instruction. The toolkit comprises a plurality of commands. The module card executes the second instruction and function as an interpreter that is configured to interpret and execute the first instruction, such that executing the first instruction implements the plurality of commands. In certain exemplary embodiments, the portable device 400 comprises a module card that is a SIM card, in which a toolkit, such as a DSTK, is stored. Accordingly, the interpreter is a DSTK interpreter (for example. Wib, a S@T interpreter, a Java interpreter), and executing the first instruction implements a plurality of commands, such as DisplayText, GetInput, and SendShortMessage.

Implementing the plurality of commands causes the processor in the portable device 400 to function as a display device, a receiving device, and a sending device. Specifically, implementing DisplayText causes the processor to function as the display device, so that the display device displays the notification on the display. Signal 504 represents the message that is displayed to the user. Implementing GetInput causes the processor to function as the receiving device, so that the receiving device receives an input as a response to the notification. Signal 505 represents the input that is received from the user. And, implementing SendShortMessage causes the processor to function as the sending device that sends a second message using the transmitter over the wireless network. The second message is the response to the notification. As described above, the second message comprises the response to the notification in at least one of a 7-bit SMS message, an 8-bit SMS message, a USSD message, or other type of cellular network message. The processor in portable device 400 sends the second message to the GS over the wireless network, for example. Signal 506 carries this second message.

In step 507, the GS prepares the second message. Preparing the second message comprises converting Signal 506 into any language as would be known to those of ordinary skill in the art, such as a markup language to effect communication via the transmitter 405. In certain exemplary embodiments, the markup language is HyperText Markup Language ("HTML"). The GS subsequently sends the second message to the SP over the computer network. Signal 508 carries this second message.

Figure 6:
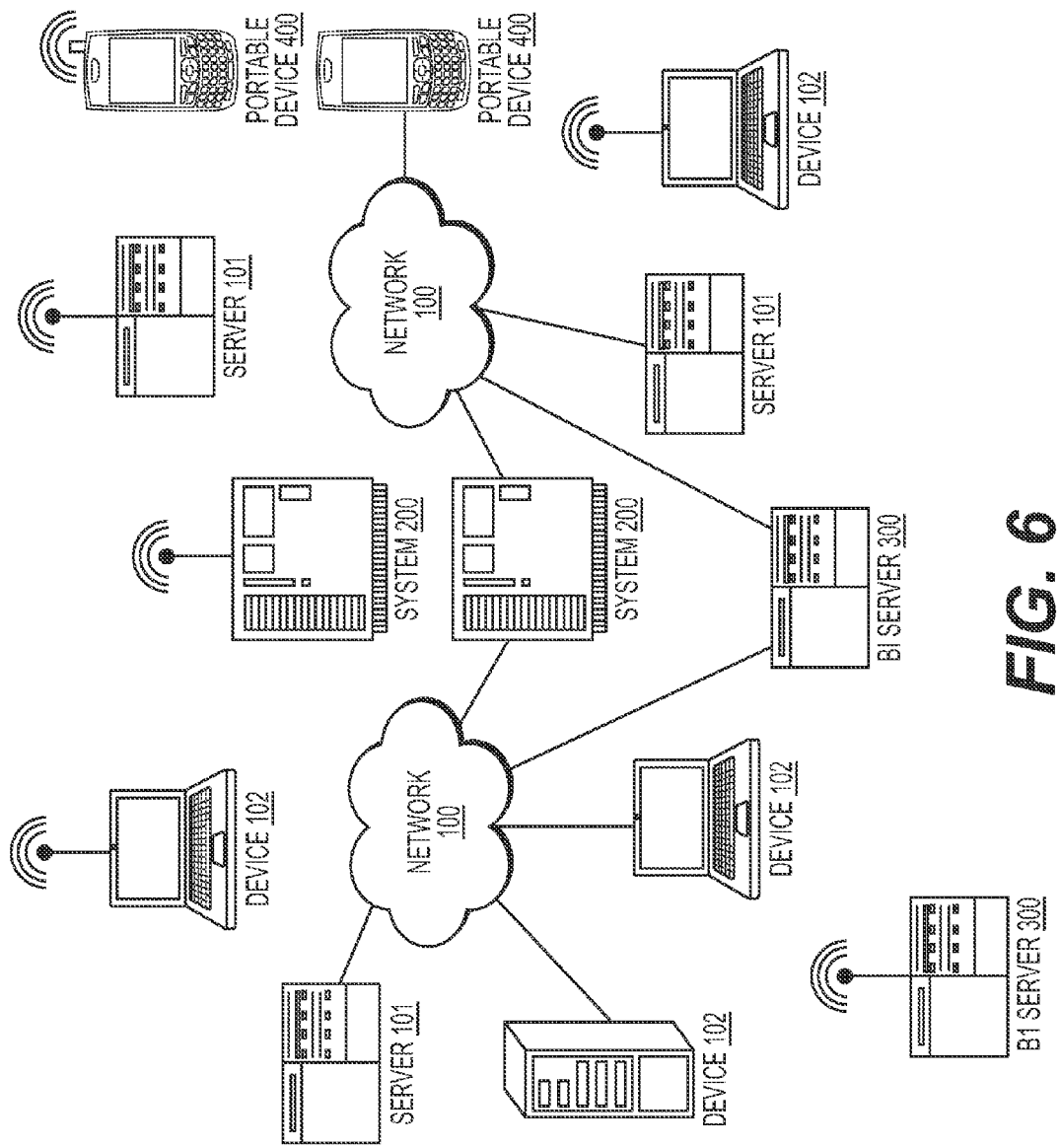
FIG. 6 is a schematic representation of another exemplary environment in which aspects of the disclosure are implemented.

Referring now to FIG. 6, a schematic representation of another exemplary embodiment of the present invention will be described. FIG. 6 shows many of the same elements as discussed above in detail with regard to FIG. 1. For example, FIG. 6 includes one or more network 100, one or more servers 101, one or more devices 102, one or more systems 200, and one or more portable devices 400. FIG. 6 also shows one or more business intelligence (BI) servers 300 coupled to network 100. As discussed above, service providers and information providers provide information to other parties utilizing the servers (for example, servers 101, in addition to BI servers 300) and devices (for example, devices 102, portable devices 400) that are coupled to network 100. BI servers 300 comprise one or more of general purpose computing devices, specialized computing devices, mainframe devices, wired devices, wireless devices, monitoring devices, infrastructure devices, and other devices configured to provide one or more of services and information to service providers, users, and other parties. BI servers 300 includes one or more BI server 300. BI server 300 monitors portable devices 400 and collects information from or about portable devices 400 that are coupled to network 100.

In exemplary embodiments of the present invention, one or more BI servers 300 are coupled to a server 101 (for example, a service provider server) and are configured to collect information relating to a portable device user's usage data from a plurality of databases. The plurality of databases may be located on one server 101 or a plurality of servers 101. The one or more BI servers 300 are configured to use a predetermined algorithm to process the collected usage data and send the processed usage data to a different server 101 (for example, the RM server 101*rm*) to determine a set of actions (for example, detailed messages to the subscriber). Server 101 generates content based on these set of actions, and sends the content to yet another server (for example, the UG server 101 *ug*), which then sends the content to the user's portable device 400 (described below).

Figure 7:
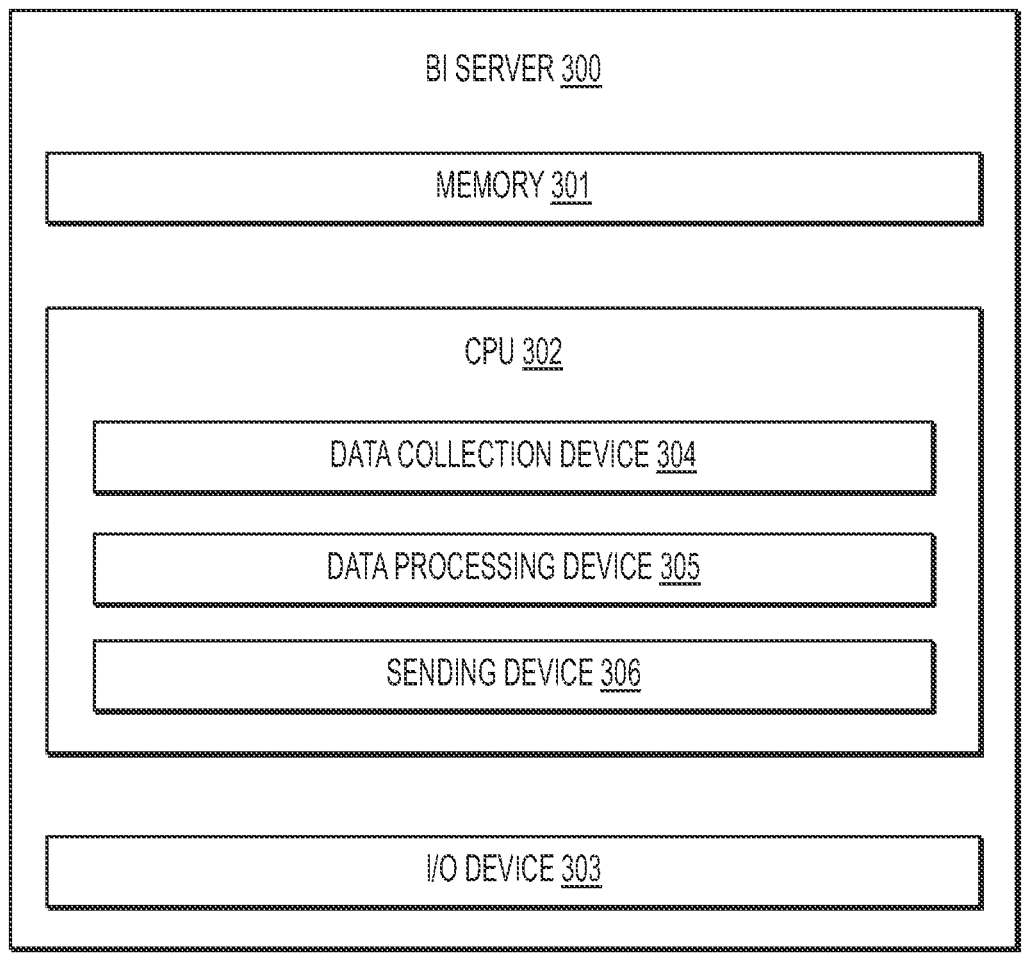
FIG. 7 is a schematic view of a business intelligence server according to particular embodiments of the invention.

Referring now to FIG. 7, BI server 300, which collects/obtains user (that is, subscriber) usage data associated with a portable device 400 from a plurality of databases is described. BI server 300 comprises, for example, a memory 301, a central processing unit ("CPU") 302, and an input and output ("I/O") device 303. Memory 301 stores computer-readable instructions that instruct BI server 300 to perform certain processes. In particular, when executed by CPU 302, the computer-readable instructions stored in memory 301 may instruct CPU 302 to operate as one or more of a data collection device 304, a data processing device 305, and a sending device 306. In particular exemplary embodiments, one or more of data collection device 304, data processing device 305, and sending device 306 are located in remote or local devices.

I/O device 303 receives one or more of data from network 100 and data from other devices and sensors coupled to BI server 300 and provides such information to CPU 302. I/O device 303 also transmits or sends data to other devices connected to network 100 (for example, the RM server). I/O device 303 may implement one or more of wireless and/or wired communications between BI server 300 and other devices.

Figure 8:
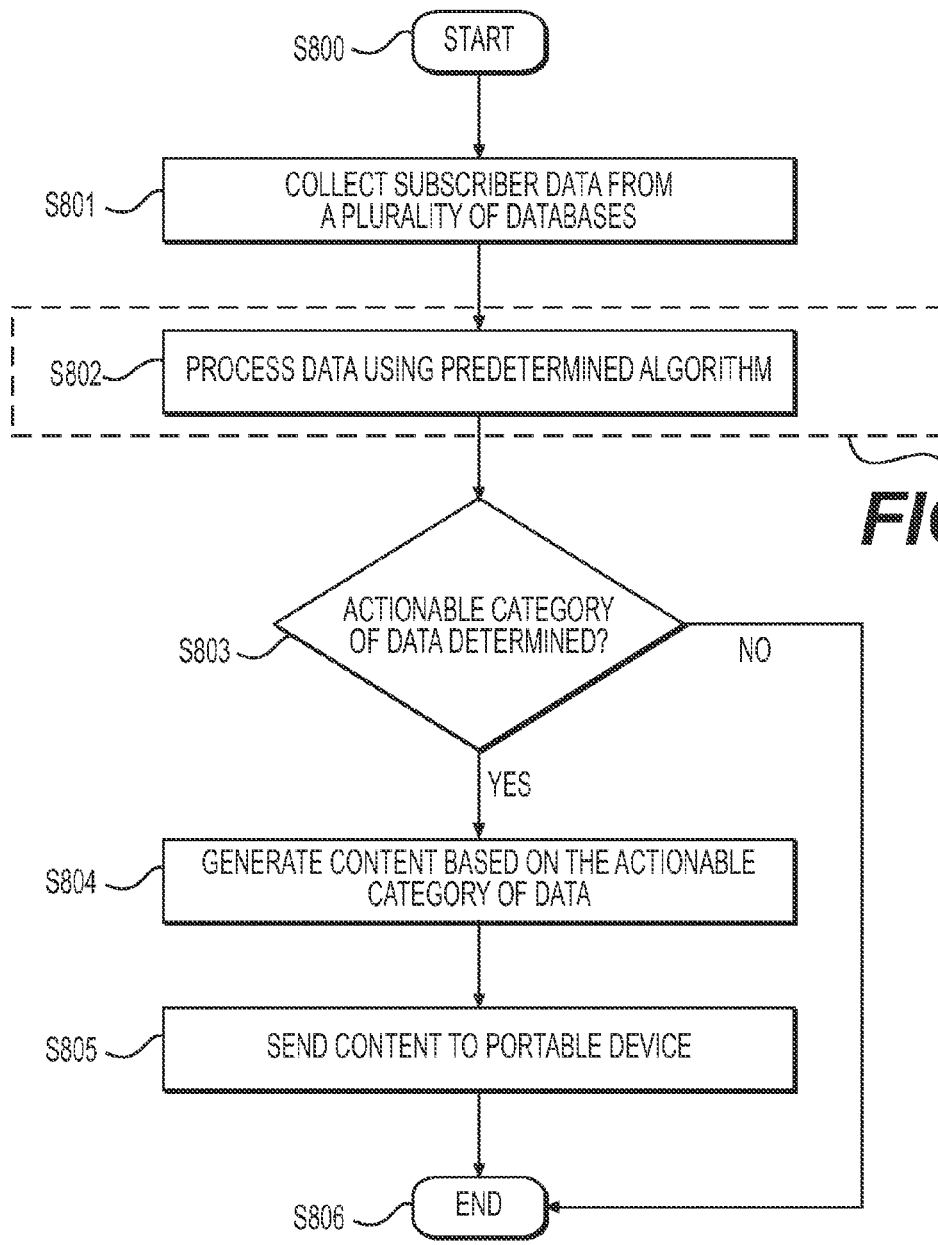
FIG. 8 presents a flow chart showing a method for presenting services to a subscriber according to particular embodiments of the invention.
Figure 9:
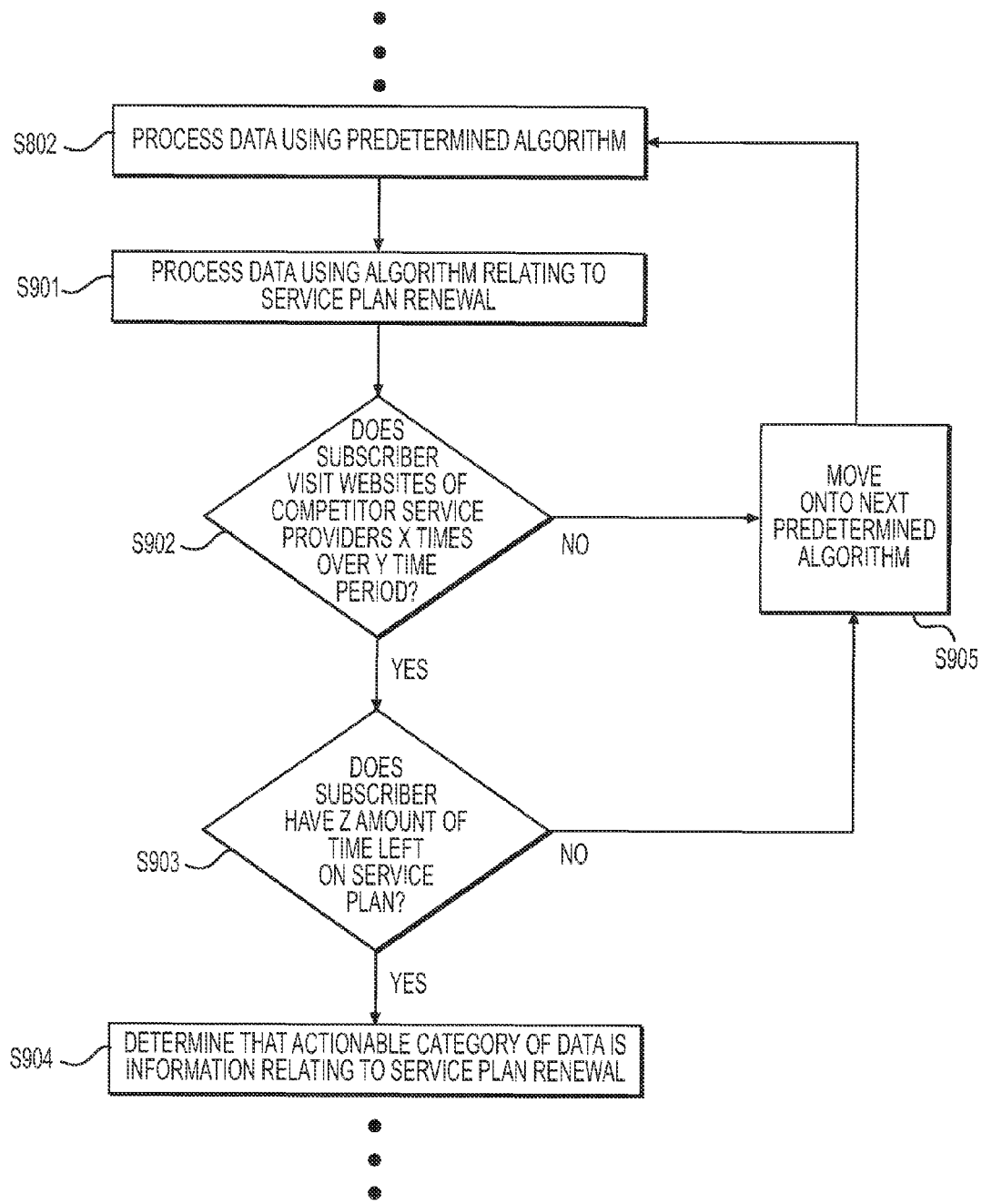
FIG. 9 presents a flow chart showing more detail for a method for presenting services to a subscriber according to particular embodiments of the invention.

Referring now to FIGS. 8 and 9, an exemplary process of the present invention performed by a plurality of servers (for example, SP server 101SP, BI server 300, RM server 101*rm*, and UG server 101GS) is described. FIG. 8 shows a process for providing services to a portable device subscriber (for example, advanced retention services, upselling services, and other similar services), starting at S800. In S801, data collection device 304 of BI server 300 collects subscriber usage data from a plurality of databases. Specifically, data collection device 304 collects data relating a subscriber's internet activity (for example, data sent to/from the subscriber in the form of bytes of data), billing information, messages sent through MMS and/or SMSC, handset information (for example, what type of handset the subscriber is using, the handset history, and any changes/switches in handsets and new upgraded handset features associated with these changes), and other information useful to retaining and/or presenting advanced services to the subscriber. In particular, BI server 300 may collect information on sudden drop or changes in portable device usage patterns (for example, changes in calls, text messages, MMS messages, data usage, viewing competitor websites, etc.); higher-than-average subscriber attrition based on location and/or geography; usage based on handset makes, models or feature sets; and previous/current rate plans.

In S802, data processing device 305 of BI server 300 processes the collected subscriber usage data using a predetermined algorithm (for example, BI server 300 processes the collected subscriber usage data to determine whether the data satisfies a predetermined condition). For example, as shown in more detail in FIG. 9, BI server 300 collects data relating to the subscriber's activity on websites of competitor service providers and data relating to the amount of time left on the subscriber's portable device server plan. Subsequently, BI server 300 processes data in S901 using an algorithm relating to service plan renewal. Specifically, BI server 300 determines in S902 whether the subscriber has visited websites of a competitor service provider X times over Y time period (for example, 10 times over 3 days). If YES, BI server 300 then determines in S903 whether the subscriber has Z amount of time left on the portable device service plan (for example, 1 month left). If YES, then BI server in S904 determines that an actionable category of data is information relating to service plan renewal (S905). The actionable category of data may include, for example, data corresponding to retaining a subscriber service, data corresponding to offering additional services to a subscriber, data corresponding to upselling services to a subscriber, and other suitable data. If in S902, or in S903. BI server 300 determines that the answer is NO, the process proceeds to S905 in which BI server 300 moves onto the next predetermined algorithm (for example, stored in memory 301).

Other examples of collected subscriber usage data include, but are not limited to, changes in a subscriber's usage that relate to an actionable category of data of presenting new wireless rate plans (for example, unlimited calling and data, specialized international rate plans, and other suitable plans); high attrition rates that relate to an actionable category of data of presenting better dealer incentives/commissions, targeted marketing, and other suitable actions; handset-related issues that relate to an actionable category of data of presenting presenting/upselling newer, modern portable devices, providing complimentary low cost smartphones at low and/or no cost, and other suitable devices; rate plan usage based on certain parameters (for example, geography, location, etc.) that relate to an actionable category of data of presenting tailored services and products; and any suitable combination thereof.

In S803 of FIG. 8, BI server 300 determines whether an actionable category of data can be determined. If YES, sending device 306 of BI server 300 sends the information relating to the actionable category of data to RM server 101rm. In S804, RM server 101rm generates content based on the actionable category of data. In particular, RM server 101rm processes the information sent from BI server 300 (for example, determine at least one action based on the actionable category of data and a predefined set of rules) and generates relevant content (for example, a set of actions) based on a predetermined set of rules. Based on the service plan renewal example discussed above, RM server 101rm may determine that relevant content relates to deals and/or incentives for service plan renewal that can be sent to portable device 400. The predefined set of rules may include a plurality of actions each of which is associated with an actionable category of data, and each of which includes the information to be sent as the message to the subscriber. The predefined set of rules may also include at least one message that is sent from UG server 101GS back to subscriber after receiving the answer to the message from the subscriber (discussed below). If BI server 300 determines in S803 that no actionable category of data can be determined, the process terminates at S806.

In S805, RM server 101rm sends the content to a portable device 400. Specifically, exemplary embodiments provide that RM server 101rm sends the content to SP server 101SP, which prepares content into a message (such as, a first message, in turn discussed below). This message is then sent from SP server 101SP to UG server 101GS, which sends the message to portable device 400. Further, as discussed above, a SM module, or alternatively, a UICC module, will decode this message into a message that can be processed by the processor of portable device 400 and displayed on the screen of portable device 400 to the user/subscriber. For example, the message displayed on the screen can be a "yes/no" question posed to the subscriber, a menu from which the subscriber can select a desired choice, a prompt asking the subscriber to enter a response, or other suitable option. Once this content is sent to portable device 400, the process terminates at S806.

Figure 10:
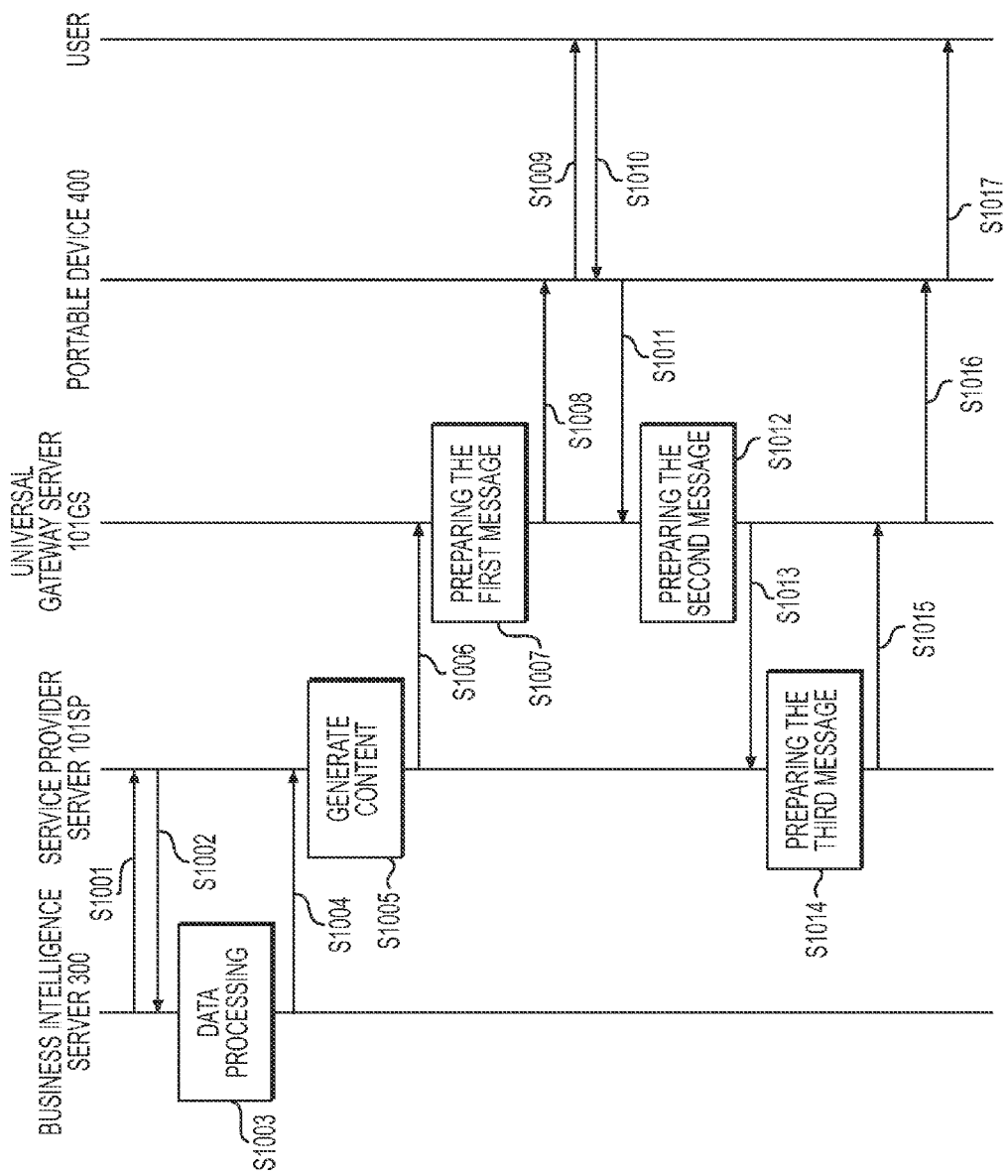
FIG. 10 presents a flow chart illustrating particular embodiments of the invention.

Referring now to FIG. 10, a flow chart of a particular embodiment including BI server 300 is described. This embodiment of the invention takes place in the environment in accordance with FIG. 6 with networks 100, servers 101, devices 102, system 200, BI server 300, and portable devices 400. In particular, the environment comprises a BI server 300, a SP server 101SP, a UG server 101GS, and a portable device 400. In S1001, BI server 300 initiates a communication with SP server 101SP to request subscriber usage data from SP server 101SP. In S1002, SP server 101SP sends BI server 300 all relevant subscriber usage data (that is, raw data) based on the request from BI server 300. Then, BI server 300 processes the collected subscriber usage data in S1003 using the predetermined algorithm and determines actionable categories of data based on the processed data (as discussed above).

In S1004, BI server 300 sends the determined actionable categories of data to SP server 101SP. Then, SP server 101SP generates content corresponding to a message (such as the first message) in S1005 based on the actionable category of data. In S1006, SP server 101SP sends the generated content in the form of a first message to UG server 101GS. In S1007, UG server 101GS prepares the first message to be sent to the subscriber. The first message includes a first instruction and a notification. In S1008, UG server 101GS sends the prepared first message to portable device 400, which in this exemplary embodiment includes a first computer and a second computer. At portable device 400, the first instruction of the first message, when executed by the first computer, causes the second computer to perform the steps of displaying the notification on a screen to the user (S1009), receive an input as a response to the notification (S1010), and send a message (for example, a second message) to the UG server 101GS (S1011), the second message including the subscriber's response to the notification.

In S1012, UG server 101GS prepares the second message to be sent to the SP server 101SP, and then in S1013, UG server 101GS sends the second message to SP server 101SP. In S1014, SP server 101SP processes the second message and prepares an optional message (for example, a third message) to be sent to the subscriber in response to the second message, if required. This third message includes, for example, an acknowledgement to the subscriber's message, a further instruction to the subscriber, a notification of other activities that will happen (for example the subscriber will be contacted by the service provider regarding updating services and/or devices), and other suitable messages. The third message is then sent from SP server 101SP to UG server 101GS (S1015), from UG server 101GS to portable device 400 (S1016), and then from portable device 400 to the user/subscriber (S1017), similarly to S1006, S1008, and S1009, discussed above. After S1017, the process terminates, unless other, optional steps follow.

Figure 11:
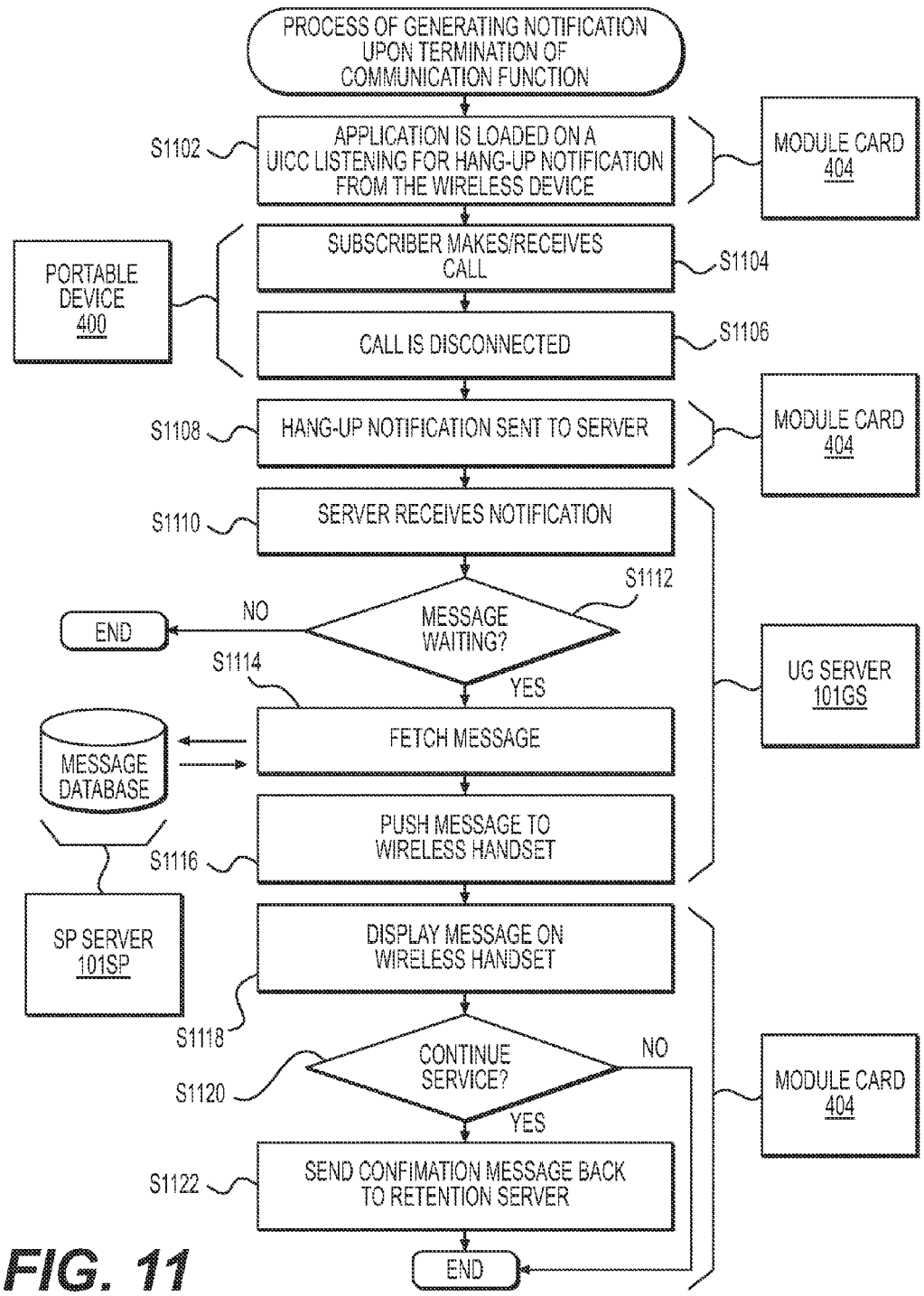
FIG. 11 presents a flow chart showing a process of generating one or more notification upon termination of a communication function according to particular embodiments of the invention.

Additional embodiments of the invention now are described with respect to FIG. 11, which presents a flow chart showing a process of generating one or more notification upon termination of a communication function according to particular embodiments of the invention.

In S1102, an application is loaded onto module card 404. The application can comprise a Wib-based application, a S@T-based application, or a Java-based application, for example. In certain embodiments, the application is a retention engine applet that processes the messages sent between module card 404 and portable device 400. In some embodiments, the application is installed onto module card 404 in conjunction with a carrier update that is pushed to the device by a service provider. In certain embodiments, such a carrier update is optional, but it can be a mandatory update in others. In particular embodiments, module card 404 loads and begins executing the application as part of a start-up process when portable device 400 is powered on, for example.

In S1104, a user (e.g., a subscriber to a telecommunication service) of portable device 400 (e.g., a device associated with the subscriber's account for the telecommunication service) makes or receives a telephone call (e.g., initiates a communication function) via portable device 400.

In S1106, the telephone call is disconnected (e.g., the communication function terminates). For example, the user can hang up portable device 400 to disconnect the call. Alternatively, another user of another communication device conversing with the user of portable device 400 can hang up the other communication device to disconnect the call. In still other configurations, the call is disconnected due to a network error or another reason out of the users' control. In any event, portable device 400 sends a message to module card 404 indicating that the call has been disconnected in response to the disconnection without regard to the reason for disconnection.

In S1108, module card 404 receives the message indicating that the call has been disconnected. In response to receiving the message indicating that the call has been disconnected at module card 404, the application loaded on module card 404 generates a message (e.g., an SMS message) and controls portable device 400 to send the message to UG server 101GS, for example. In some embodiments, the message includes a notification indicating that the call has recently been disconnected. In other embodiments, the message is a basic message, such as "do you have a message for me?", and can be coded in a variety of manners.

In S1110, UG server 101GS receives the notification from module card 404 and determines that the call has been disconnected.

In S1112, UG server 101GS determines whether a message is currently waiting at SP server 101SP (e.g., a message generated from content received from RM server 101rm) for presentation to a user of portable device 400. In some embodiments, in response to receiving the notification that the call has been disconnected in S1110, UG server 101GS sends a first request to SP server 101SP that asks SP server 101SP whether a message for presentation to a user of portable device 400 is currently waiting at SP server 101SP. SP server 101SP subsequently may transmit a response to UG server 101GS that indicates whether such a message exists. If UG server 101GS determines that the message does not exist (S1112: No), the process ends, and UG server 101GS waits to receive another notification from module card 404 indicating that another call was disconnected. If UG server 101GS determines that the message exists (S1112: Yes), the process proceeds to S1114.

In S1114, UG server 101GS fetches the message from SP server 101SP (e.g., a message database). In particular embodiments, this process is similar to the process of S1006 described above with respect to FIG. 10 or the process of S305 described above with respect to FIG. 3. For example, the message is an actionable message that includes information and retention and/or upselling of additional or new services relevant to the subscriber account, as determined from the analysis of BI server. The message may be selected from a plurality of messages in the message database or may be generated in a manner similar to that of process S304 or S1005 described above with respect to FIGS. 3 and 10, for example.

The content of the message may be written in any language that would be known to those of ordinary skill in the art, such as, for example, a markup language. Markup languages comprise, for example, WIG WML, S@TML, and JavaML. For example, the message can include a notification and an instruction. In some embodiments, the notification can include a retention question that asks the user whether he or she would like to retain or continue receiving the service. For example, if a user is receiving a wireless communication service from a wireless carrier referred to as "A," the first message might read: "Would you like to continue receiving A's wireless communication service?" In other embodiments, the notification can include an upsale question that asks the user whether he or she would like to modify or upgrade the service. The instruction includes an application and, when interpreted and executed by a first computer, implements a plurality of commands. For example, in a GSM network, the first instruction comprises a wiblet, a s@tlet, or a Java applet. The wiblet is a small application that is Wib-based; the s@tlet is a small application that is S@T-based; and the Java applet is a small application that is Java-based. As described above, a Wib-based application is an application that is in the form of Wib bytecode and is executed by Wib (for example, a Wib interpreter); a S@T-based application is an application that is in the form of S@T bytecode and is executed by a S@T interpreter; and a Java-based application is an application that is in the form of Java bytecode and is executed by a Java interpreter.

In S1116, UG server 101GS pushes the message to portable device 400. More specifically, UG server 101GS pushes the message to module card 404. For example, UG server 101GS prepares the message to be sent to portable device 400. Subsequently, UG server 101GS sends the prepared message to portable device 400. This may be similar to processes S1007 and S1008 described above with respect to FIG. 10, process S805 described above with respect to FIG. 8, or the processes associated with signals 502 and 503 described above with respect to FIG. 5, for example.

In S1118, module card 404, for example, controls portable device 400 to display the message received from UG server 101GS. The instruction included in such a message, for example, instructs module card 404, which in turn instructs portable device 400, to display the notification included in the message. This process may be similar to process S1009 described above with respect to FIG. 10 or the processes associated with signal 504 described above with respect to FIG. 5, for example. In some embodiments, the notification displayed on portable device 400 prompts the user of portable device 400 for a response, such as a text input including affirmation language (for example, "Y," "Yes," "Sure," "Why Not," "Yea," "Yeah," "Yup," "Go for it"), declination language (for example, "Nah," "Nope," "Negative"), or a selection of a presented option (for example, a selection of button or key representing an affirmation, a selection of a key representing an declination, a selection from a list of services and/or upgrade options).

In S1120, module card 404 determines whether the user has selected an upsale and/or retention option. In particular, the user can input a response, via an input interface of portable device 400, to the notification displayed on portable device 400. The response may be a selection of an upgrade option, a retention option, an affirmation, a declination, or another option related to an account for a telecommunication or other service. After the user inputs the response, module card 404 receives the input response and determines whether the user has selected an upsale and/or retention option. In some embodiments, this process is similar to process S1010 described above with respect to FIG. 10 or the processes associated with signal 505 described above with respect to FIG. 5, for example. If module card 404 determines that the response indicates that the user has not selected an upsale and/or retention option, the process terminates. At this point, module card 404 waits to receive another notification that a call has been disconnected and UG server 101GS waits to receive another notification from module card 404 indicating the same. If module card 404 determines that the response indicates that the user has selected an upsale and/or retention option, the process proceeds to S1122.

In S1122, module card 404 controls portable device 400 to send a confirmation message back to SP server 101 SP via UG server 101GS. In some embodiments, the message is a 7-bit SMS message, an 8-bit SMS message, a USSD message, an MMS message, or another type of cellular network message, for example. In certain embodiments, the confirmation message includes a notification indicating that the user has selected an option to retain and/or upgrade the service and, in embodiments in which a particular upgrade option was selected, indicating which upgrade option the user selected. In particular embodiments, the confirmation message includes a copy of the response input by the user. In some embodiments, portable device 400 sends the message to UG server 101GS, UG server 101GS prepares a version of the message for SP server 101SP, and UG server 101GS sends the prepared version of the message to SP server 101SP. The process may be similar to processes S1011-S1013 described above with respect to FIG. 10 or the processes associated with signals 506-508 described above with respect to FIG. 5, for example. After S1122, the process may end.

In particular configurations, SP server 101SP receives the message and prepares an optional message to be sent to the subscriber in response to the message. This optional message includes, for example, an acknowledgement to the subscriber's message, a further instruction to the subscriber, a notification of other activities that will happen (for example the subscriber will be contacted by the service provider regarding updating services and/or devices), and other suitable messages. The optional message is then sent from SP server 101SP to UG server 101GS, from UG server 101GS to portable device 400, and then from portable device 400 to the user/subscriber. This process may be similar to processes S1014-S1017 described above with respect to FIG. 10, for example.

Certain exemplary embodiments have been described above with respect to module cards having a variety of formats and configurations. Nevertheless, module cards contemplated by this disclosure are not limited to the example module cards described herein and include any appropriate module card able to perform one or more aspects of the invention contemplated herein. For example, a module card can be one or more of a SIM card, a UICC, an electronic SIM ("eSIM") card, an electronic UICC ("eUICC") card, and any other appropriate module card.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A portable device for performing one or more communication functions, the portable device comprising:
   a processor;
   a display; and
   a module card comprising a memory, the memory configured to store:
      a toolkit comprising a plurality of commands; and
      a second instruction that, when executed by the module card, instructs the module card to function as an interpreter configured to interpret a first instruction,
   wherein the processor is configured to:
      determine whether a communication function of the portable device successfully connected to a wireless network has terminated; and
      in response to determining that the communication function of the portable device has terminated after disconnecting from the wireless network, send a first notification to the module card, the first notification indicating that the communication function of the portable device has terminated;
wherein the module card is configured to:
in response to receiving the first notification, send a first message to a server, the first message indicating that the portable device is ready to receive a second message;
receive the second message from the server,
the second message being in response to the first message,
the second message comprising a second notification and the first instruction,
the second notification based on usage data of a subscriber account associated with the portable device, and
the second notification identifying an actionable category with respect to the subscriber account,
wherein the first instruction, when executed by the interpreter, implements the plurality of commands, such that the processor functions as:
a display device configured to display the second notification on the display;
a receiving device configured to receive an input as a response to the second notification;
a determining device configured to determine whether the response corresponds to a confirmation to implement the actionable category with respect to the subscriber account; and
a sending device configured to, in response to the determining device determining that the response corresponds to the confirmation to take implement the actionable category with respect to the subscriber account, send a third message, the third message comprising the response to the second notification.

2. The portable device of claim 1,
wherein the subscriber account is an account for a mobile telecommunications service, and
wherein the mobile telecommunications service comprises at least one of:
a voice service,
a data service, and
a messaging service.

3. The portable device of claim 2, wherein the actionable category with respect to the subscriber account is an action of retaining the mobile telecommunications service.

4. The portable device of claim 2,
wherein the second notification comprises one or more offers to modify the mobile telecommunications service associated with the subscriber account, and
wherein the actionable category with respect to the subscriber account is an action of accepting one of the one or more offers to modify the mobile telecommunications service associated with the subscriber account.

5. The portable device of claim 1, wherein the usage data comprises at least one of:
data relating to web activity associated with the subscriber account,
data relating to a portable device service plan associated with the subscriber account,
data relating to data usage associated with the subscriber account,
data relating to telephone call activity associated with the subscriber account,
data relating to text messaging activity associated with the subscriber account, and
data relating to multimedia messaging activity associated with the subscriber account.

6. The portable device of claim 1, wherein the display device is configured to display the second notification such that the second notification covers an item previously displayed on the display.

7. The portable device of claim 1, wherein the second notification comprises at least one of:
a question requiring a response of "yes" or "no";
a menu including a predetermined number of choices; and
a prompt requesting a subscriber-generated response.

8. A non-transitory, computer-readable medium configured to store computer-readable instructions that, when executed by a portable device comprising a processor, a module card, and a display, instruct the portable device to perform processes comprising:
determining, by the processor, whether a communication function of the portable device successfully connected to a wireless network has terminated; and
in response to the processor determining that the communication function of the portable device has terminated after disconnecting from the wireless network, sending a first notification from the processor to the module card, the first notification indicating that the communication function of the portable device has terminated;
in response to receiving the first notification at the module card, sending a first message from the module card to a server, the first message indicating that the portable device is ready to receive a second message;
receiving the second message from the server,
the second message being in response to the first message,
the second message comprising a second notification and a first instruction,
the second notification based on usage data of a subscriber account associated with the portable device, and
the second notification identifying an actionable category with respect to the sub scriber account;
executing, by the module card, a second instruction that instructs the module card to function as an interpreter configured to interpret the first instruction;
executing, by the module card functioning as the interpreter, the first instruction, such that the processor functions as:
a display device configured to display the second notification on the display;
a receiving device configured to receive an input as a response to the second notification;
a determining device configured to determine whether the response corresponds to a confirmation to implement the actionable category with respect to the subscriber account; and
a sending device configured to, in response to the determining device determining that the response corresponds to the confirmation to implement the actionable category with respect to the subscriber account, send a third message, the third message comprising the response to the second notification.

9. The non-transitory, computer-readable medium of claim 8,
wherein the subscriber account is an account for a mobile telecommunications service, and wherein the mobile telecommunications service comprises at least one of:
a voice service,
a data service, and
a messaging service.

10. The non-transitory, computer-readable medium of claim 9, wherein the actionable category with respect to the subscriber account is an action of retaining the mobile telecommunications service.

11. The non-transitory, computer-readable medium of claim 9,
wherein the second notification comprises one or more offers to modify the mobile telecommunications service associated with the subscriber account, and
wherein the actionable category with respect to the subscriber account is an action of accepting one of the one or more offers to modify the mobile telecommunications service associated with the subscriber account.

12. The non-transitory, computer-readable medium of claim 8, wherein the usage data comprises at least one of:
data relating to web activity associated with the subscriber account,
data relating to a portable device service plan associated with the subscriber account,
data relating to data usage associated with the subscriber account,
data relating to telephone call activity associated with the subscriber account,
data relating to text messaging activity associated with the subscriber account, and
data relating to multimedia messaging activity associated with the subscriber account.

13. The non-transitory, computer-readable medium of claim 8, wherein the display device is configured to display the second notification such that the second notification covers an item previously displayed on the display.

14. The non-transitory, computer-readable medium of claim 8, wherein the second notification comprises at least one of:
a question requiring a response of "yes" or "no";
a menu including a predetermined number of choices; and
a prompt requesting a subscriber-generated response.

15. A method for controlling a portable device comprising a processor, a module card, and a display, the method comprising:
determining, by the processor, whether a communication function of the portable device successfully connected to a wireless network has terminated; and
in response to the processor determining that the communication function of the portable device has terminated after disconnecting from the wireless network, sending a first notification from the processor to the module card, the first notification indicating that the communication function of the portable device has terminated;
in response to receiving the first notification at the module card, sending a first message from the module card to a server, the first message indicating that the portable device is ready to receive a second message;
receiving the second message from the server,
the second message being in response to the first message,
the second message comprising a second notification and a first instruction,
the second notification based on usage data of a subscriber account associated with the portable device, and
the second notification identifying an actionable category with respect to the sub scriber account;
executing, by the module card, a second instruction that instructs the module card to function as an interpreter configured to interpret the first instruction;
executing, by the module card functioning as the interpreter, the first instruction, such that the processor functions as:
a display device configured to display the second notification on the display;
a receiving device configured to receive an input as a response to the second notification;
a determining device configured to determine whether the response corresponds to a confirmation to implement the actionable category with respect to the subscriber account; and
a sending device configured to, in response to the determining device determining that the response corresponds to the confirmation to implement the actionable category with respect to the subscriber account, send a third message, the third message comprising the response to the second notification.

16. The method of claim 15,
wherein the subscriber account is an account for a mobile telecommunications service, and
wherein the mobile telecommunications service comprises at least one of:
a voice service,
a data service, and
a messaging service.

17. The method of claim 16, wherein the actionable category with respect to the subscriber account is an action of retaining the mobile telecommunications service.

18. The method of claim 16,
wherein the second notification comprises one or more offers to modify the mobile telecommunications service associated with the subscriber account, and
wherein the actionable category with respect to the subscriber account is an action of accepting one of the one or more offers to modify the mobile telecommunications service associated with the subscriber account.

19. The method of claim 15, wherein the usage data comprises at least one of:
data relating to web activity associated with the subscriber account,
data relating to a portable device service plan associated with the subscriber account,
data relating to data usage associated with the subscriber account,
data relating to telephone call activity associated with the subscriber account,
data relating to text messaging activity associated with the subscriber account, and
data relating to multimedia messaging activity associated with the subscriber account.

20. The method of claim 15, wherein the second notification comprises at least one of:
a question requiring a response of "yes" or "no";
a menu including a predetermined number of choices; and
a prompt requesting a subscriber-generated response.

* * * * *